United States Patent [19]
Taki et al.

[11] Patent Number: 5,418,082
[45] Date of Patent: May 23, 1995

[54] SEALED BATTERY WITH CURRENT CUT OFF MEANS

[75] Inventors: Kiyohiro Taki, Kanagawa; Kazuo Togashi, Fukushima; Toshimitsu Masuko, Fukushima; Kiyoshi Katayama, Fukushima; Takeshi Yuda; Hiroshi Nishikawa, both of Kanagawa; Ryoichi Yamane, Tokyo, all of Japan

[73] Assignee: Sony Corporation, Tokyo, Japan

[21] Appl. No.: 75,775

[22] Filed: Jun. 11, 1993

[30] Foreign Application Priority Data

Jun. 12, 1992 [JP] Japan ................................ 4-153500

[51] Int. Cl.⁶ ............................................. H01M 2/12
[52] U.S. Cl. ........................................ 429/53; 429/61; 429/72
[58] Field of Search ............................ 429/53–59, 429/61, 62, 72, 171, 172

[56] References Cited

U.S. PATENT DOCUMENTS 4,943,497  7/1990  Oishi et al. .
5,057,382  10/1991  Tucholski .
5,171,648  12/1992  Beard .

FOREIGN PATENT DOCUMENTS

0364995  10/1889  European Pat. Off. .
1939360  3/1970  Germany .
3039809  5/1982  Germany .

*Primary Examiner*—Anthony Skapars
*Attorney, Agent, or Firm*—Hill, Steadman & Simpson

[57] ABSTRACT

A sealed battery including a safety valve made of a metal plate which can be deformed by the increase of the inner pressure of the battery, and current cutting-off means which is actuated by the deformation of the safety valve, wherein the safety valve has a safety valve projection provided at its center to project toward an electric power generating element of the battery, a disk having a central aperture in which the safety valve projection is inserted and gas apertures through which gas is passed is fixed between the safety valve and the electric power generating element, a thin metal plate to which one of the leads of the electric power generating element is connected is attached to the element side of the disk to close the central aperture, and the safety valve projection is welded to the thin metal plate through the central aperture. In another embodiment, instead of the thin metal plate, a disk made of metal is fixed between the safety valve and the electric power generating element and the safety valve projection is welded to the center of the disk.

3 Claims, 10 Drawing Sheets

SEALED BATTERY WITH CURRENT CUT OFF MEANS

BACKGROUND OF THE INVENTION

1. Field of the Invention

This invention generally relates to batteries and, more particularly, to a sealed battery.

2. Description of the Prior Art

In recent years, a secondary cell or battery such as a lithium battery, a carbon lithium battery or the like is widely used in video tape recorders, clocks and so on.

The batteries of this kind take a sealed structure, but sometimes cause explosions because the electric power generating element enclosed within the battery causes a chemical change to increase the inner pressure.

If a nonaqueous electrolyte battery, normally such as-the lithium battery is overcharged or short-circuited to flow a large current by mistake or the like, the electrolysis solution may be sometimes decomposed to produce a gas. The battery, when filled with this gas, has its inner pressure raised by this gas and may be instantly destroyed.

U.S. Pat. No. 4,943,497 describes a sealed battery that can prevent such an accident.

Figure 1:
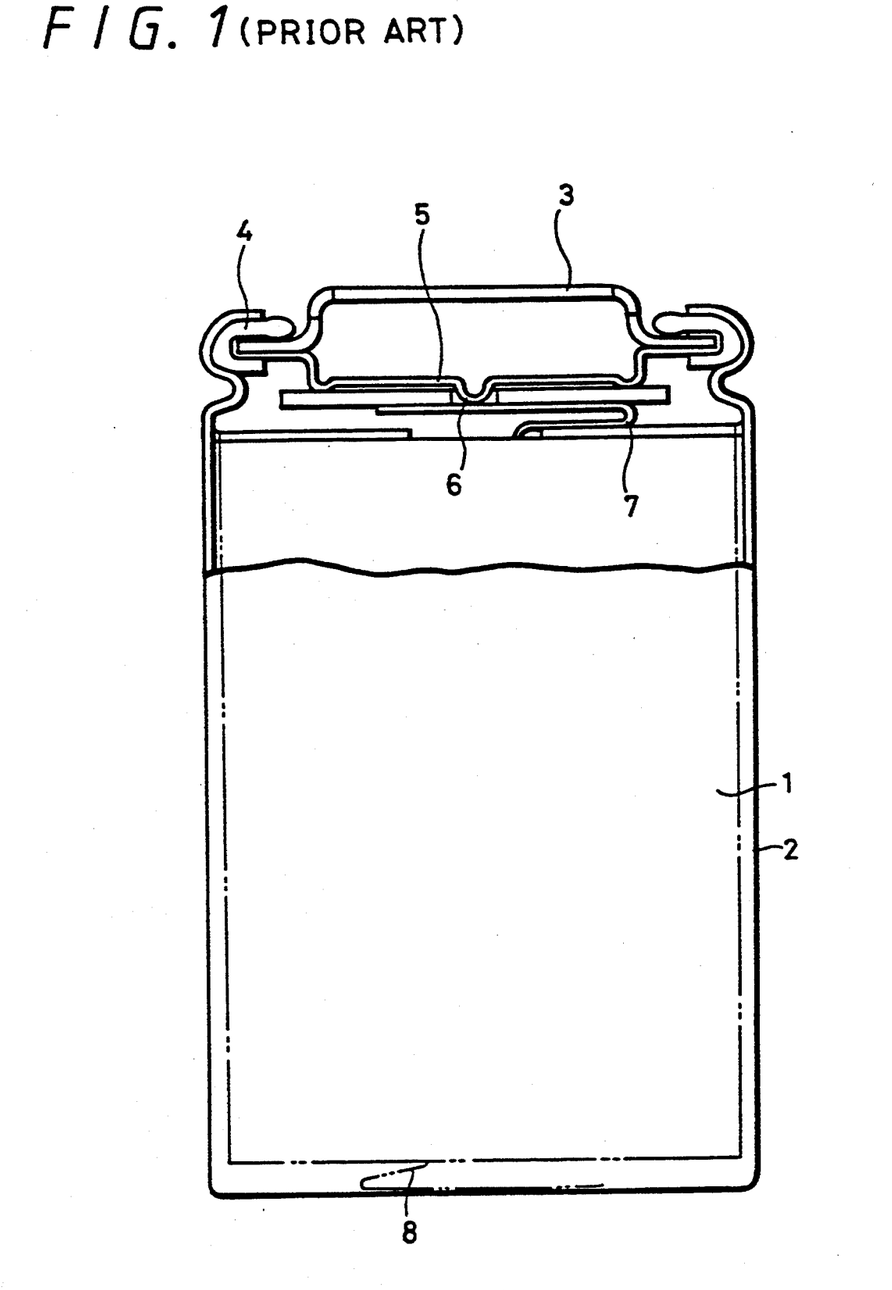
FIG. 1 is a partially cross-sectional side view of a conventional sealed battery.

This proposed sealed battery, as shown in FIG. 1, has an outer can 2 within which an electric power generating element 1 is enclosed, and a lid 3 which is normally used as the positive electrode terminal and mounted at the open end of the can 2 through a ring-shaped gasket 4 so as to seal the lid 4 to the can 2. In addition, a safety valve 5 is provided within this lid 3. This safety valve 5 is made of a metal plate which is easily deformed by the increase of the pressure within the battery. Also, current cutting-off means 6 is actuated by the deformation of the safety valve 5.

Figure 2:
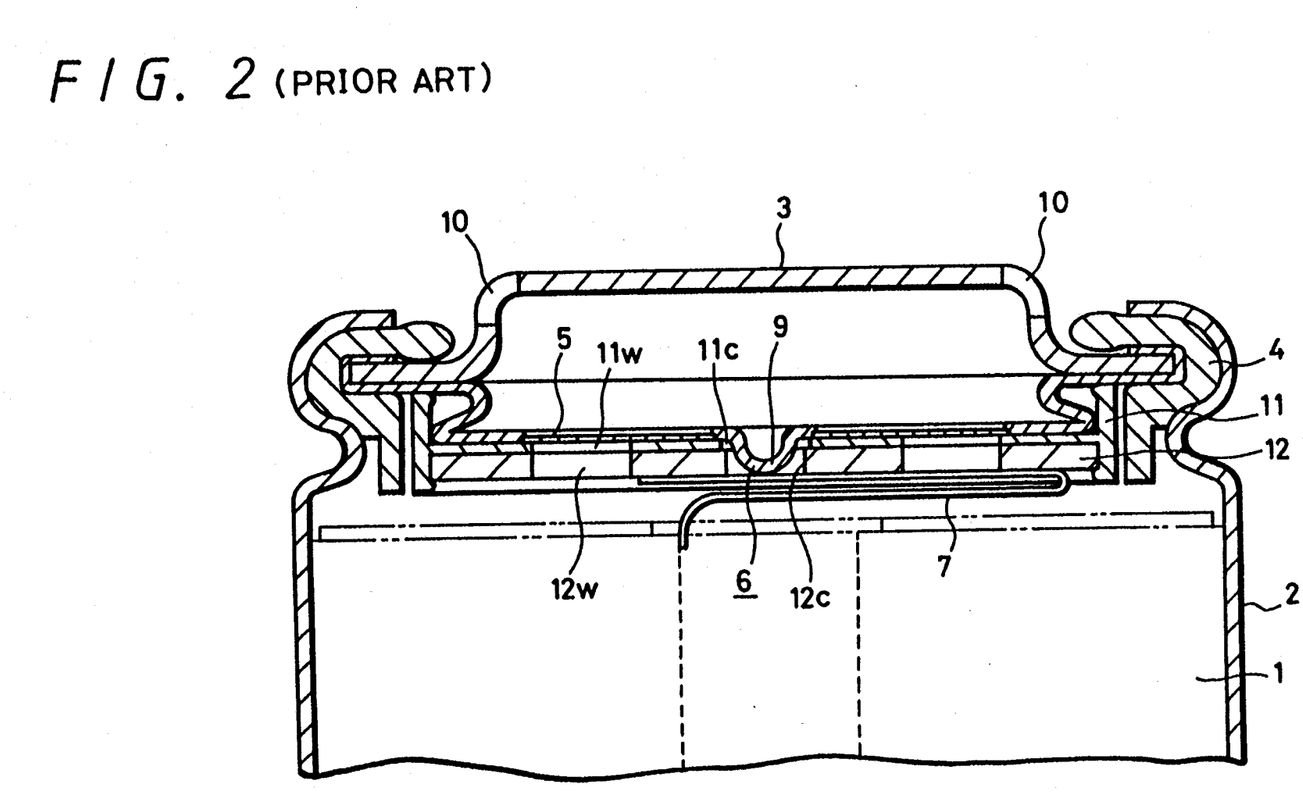
FIG. 2 is a cross-sectional view of a main part of the conventional sealed battery.
Figure 3:
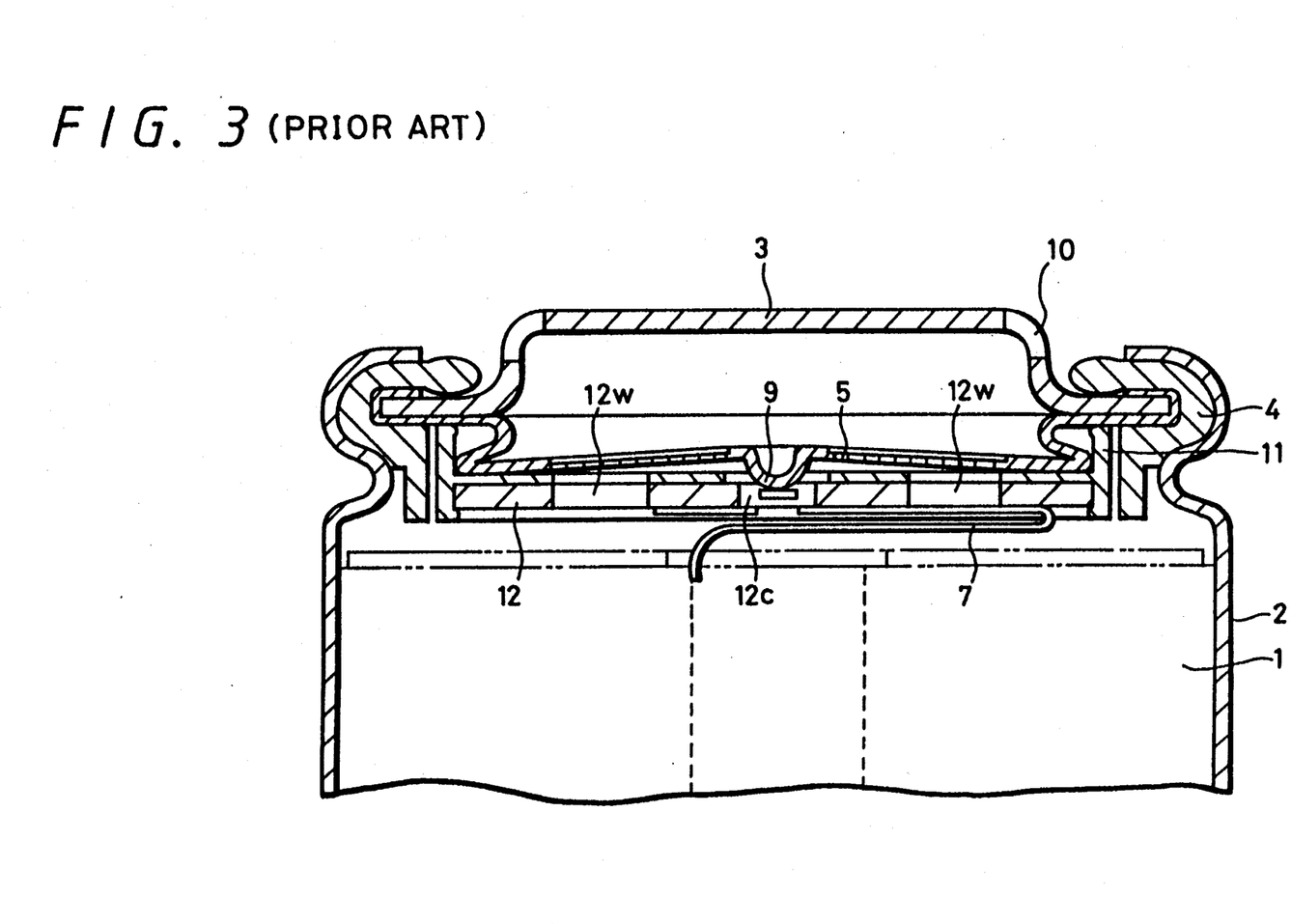
FIG. 3 is another cross-sectional view of the main part of the conventional sealed battery, showing the abnormal condition.

FIGS. 2 and 3 are magnified cross-sectional views of a main part of the above battery, showing the normal state and the abnormal state in which the pressure within the battery is increased, respectively. The electric power generating element 1 has, for example, sheets of negative and positive electrode materials and a separator. This separator has an electrolysis solution impregnated therein. The sheets are wound together in a cylindrical shape, gripping the separator therebetween. In addition, ribbon-like lead plates 7 and 8 are drawn out of the negative electrode and positive electrode sheets. One of the lead plates, or the lead plate 8, is connected to the bottom of the outer can 2 (see FIG. 1).

The safety valve 5 is made of a metal plate of a disk shape and formed to be a dish-like disk shape which projects toward the electric power generating element 1, by press molding. This safety valve 5 also has a safety valve projection 9 provided at the center thereof to project toward the electric power generating element 1. The outer peripheral flange portion of the safety valve 5 is bent to wrap or hold, for example, the outer peripheral edge of the lid 3. This outer peripheral flange and the edge of the lid 3 are pressed by caulking against the open end of the outer can 2 through the ring-shaped gasket 4, thereby sealing the outer can 2.

The lid 3 has apertures 10 bored therein for exhausting the gas. However, the outer can 2 is maintained to be hermetically sealed or to be shut off from the outside by the valve 5.

In addition, a cylindrical disk holder 11 is fixedly fitted on the outer periphery of the safety valve 5 to be held.

Figure 4:
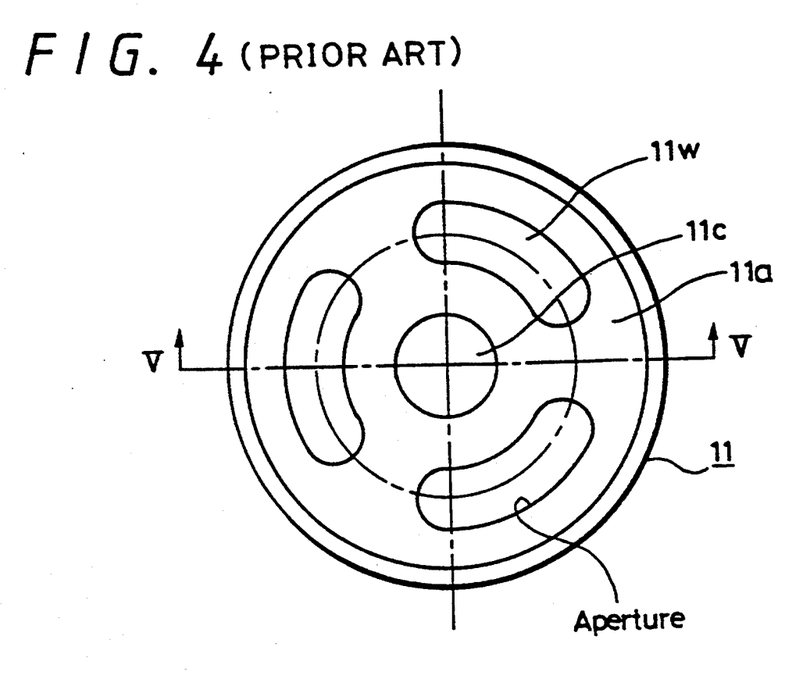
FIG. 4 is a plan view of a disk holder of the conventional sealed battery.
Figure 5:
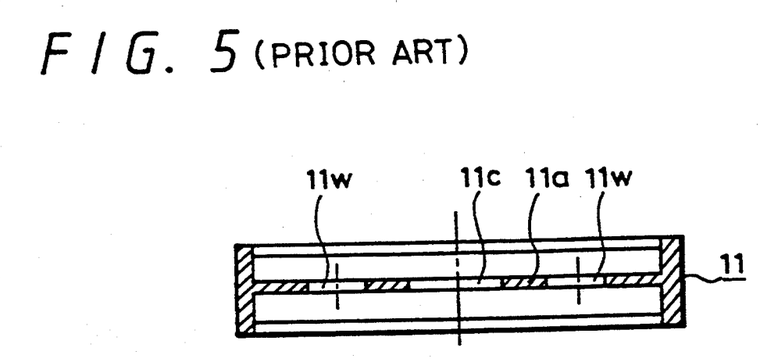
FIG. 5 is a cross-sectional view of the disk holder of the conventional sealed battery.

This cylindrical disk holder 11 has provided therein a flat plate 11a perpendicular to its axis as shown in FIGS. 4 and 5 which are respectively a plan view of the disk holder 11, and a cross-sectional diagram taken along the line V—V in the plan view. A disk 12 is forced to be fitted within the disk holder 11.

The flat plate 11a of the holder 11 and the disk 12 have central apertures 11c and 12c bored, respectively. The safety valve projection 9 of the safety valve 5 is inserted through these apertures 11c and 12c to reach the electric power generating element 1 side of the disk 12. Thus, the tip of this projection 9 hits the positive-electrode lead 7 of the electric power generating element 1. Then, the tip of the projection 9 and the lead 7 are joined by ultrasonic welding or other means.

The disk 12 and the flat plate 11a of the disk holder 11 also have apertures 12W and 11W bored at the corresponding positions, respectively, so that gas can be exhausted through these apertures.

If a gas is generated by some cause in the accommodating portion for the element 1 of the battery to increase the inner pressure, the safety valve 5 is pushed up by the pressure of the gas which has passed through the aperture 12W of the disk 2 and the aperture 11W of the flat plate 11a of the disk holder 11. As a result, the safety valve 5 is deformed, or swollen toward the lid 3 as shown in FIG. 3. Therefore, the pressure within the battery can be reduced by this deformation of the safety valve 5, and also the projection 9 is forced to rise in proportion to the deformation of the safety valve 5. At this time, the ribbon lead 7 welded to the tip of the projection 9 is also forced to rise, but the lead 7 cannot be moved because it is blocked by the disk 12. Thus, the tip of the projection 9 is pulled off from the ribbon-shaped lead 7 so that the lead 7 is electrically disconnected from the safety valve 5, or that the element 1 of the battery is electrically disconnected from the lid 3. The current cutting-off means 6 is thus constructed as above.

In this way, the gas can be stopped from generation and the pressure within the battery can be suppressed from increase.

According to this arrangement, however, the ribbon-shaped lead 7 which is generally about 3 mm wide and flexible may be drawn in the central aperture 12c of the disk 12 when the pressure within the battery is increased to deform the safety valve 5. At this time, the lead 7 is not always be surely pulled off, or cut from the joint with the tip of the projection 9. In addition, since the cut end of the lead 7 which is disconnected and pulled up to float may be inadvertently made in contact with the can 2, or with the negative electrode to cause a short-circuit, thus losing the safety.

OBJECTS AND SUMMARY OF THE INVENTION

Therefore, it is a general object of the present invention to provide an improved sealed battery in which the aforesaid shortcomings and disadvantages of the prior art can be eliminated.

More specifically, it is an object of the present invention to provide a sealed battery in which when the pressure within the battery is increased, the current is sure to be cut off, the pressure within the battery can be reduced without error, and the short-circuiting by the lead can be prevented not to cause the destructive failure of the battery.

According to a first aspect of the present invention, there is provided a sealed battery including a safety valve made of a metal plate which can be deformed by the increase of the inner pressure of a battery, and current cutting-off means which is actuated by the deformation of the safety valve, wherein the safety valve has a safety valve projection provided at its center to project toward an electric power generating element of the battery, a disk having a central aperture in which the safety valve projection is inserted and gas apertures through which gas is passed is fixed between the safety valve and the electric power generating element, a thin metal plate to which one of the leads of the electric power generating element is connected is attached to the element side of the disk to close the central aperture, and the safety valve projection is welded to the thin metal plate through the central aperture.

According to a second aspect of the present invention, there is provided a sealed battery including a safety valve made of a metal plate which can be deformed by the increase of the inner pressure of a battery, and current cutting-off means which is actuated by the deformation of the safety valve, wherein the safety valve has a safety valve projection provided at its center to project toward an electric power generating element of the battery, a disk made of metal is fixed between the safety valve and the electric power generating element, the safety valve projection is welded to the center of the disk, the disk also has gas apertures provided at other positions than the center, and one of the leads of the electric power generating element is electrically connected to the element side of the disk.

According to this invention, when the inner pressure of the battery is increased, the current can be surely cut off, and the inner pressure can be surely reduced without causing a short-circuit by the lead so that the battery can be prevented from destructive explosion.

The above and other objects, features, and advantages of the present invention will become apparent from the following detailed description of illustrative embodiments thereof to be read in conjunction with the accompanying drawings, in which like reference numerals are used to identify the same or similar parts in the several view.

DETAILED DESCRIPTION OF THE PREFERRED EMBODIMENTS

The present invention will now be described in detail with reference to the drawings.

Figure 6:
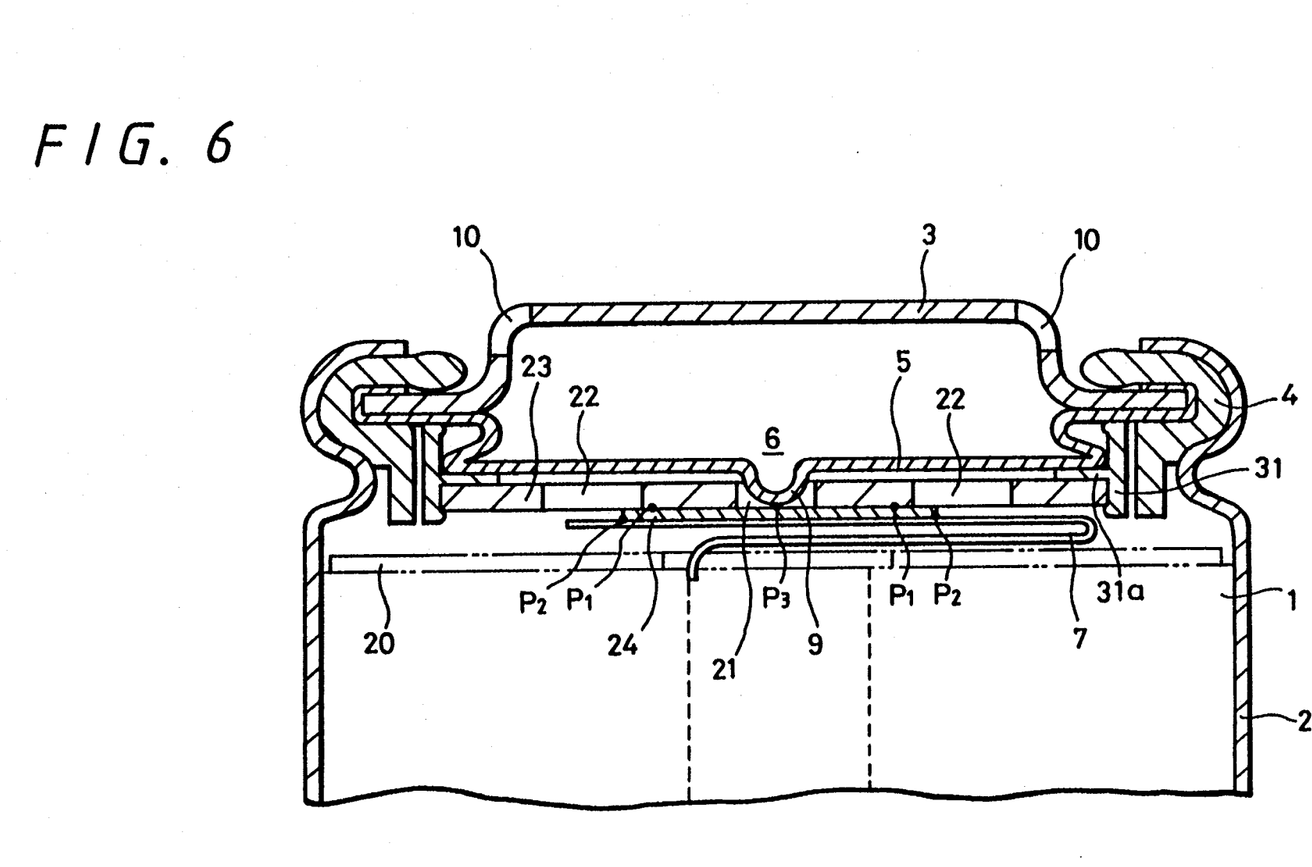
FIG. 6 is a cross-sectional view of a main part of one embodiment of a sealed battery according to the present invention.

FIG. 6 is a cross-sectional view of a main part of an embodiment of the sealed battery according to the present invention. This sealed battery has the safety valve 5 which is made of a metal plate that is deformed by the increase of the pressure within the battery, and the current cutting-off means 6 which is actuated by the deformation of the safety valve 5. In addition, a disk 23 is fixed between the safety valve 5 and the electric power generating element 1. This disk 23 has a central aperture 21 in which the projection 9 of the safety valve 5 is inserted, and gas apertures 22 through which a gas is passed.

Moreover, a thin metal plate 24 which is electrically connected to one ribbon lead 7 of the electric power generating element 1 is attached to the element 1 side of the disk 23 in such a manner as to close the central aperture 21.

On the other hand, the safety valve projection 9 is welded through the central aperture 21 to the thin metal plate 24.

Figure 8:
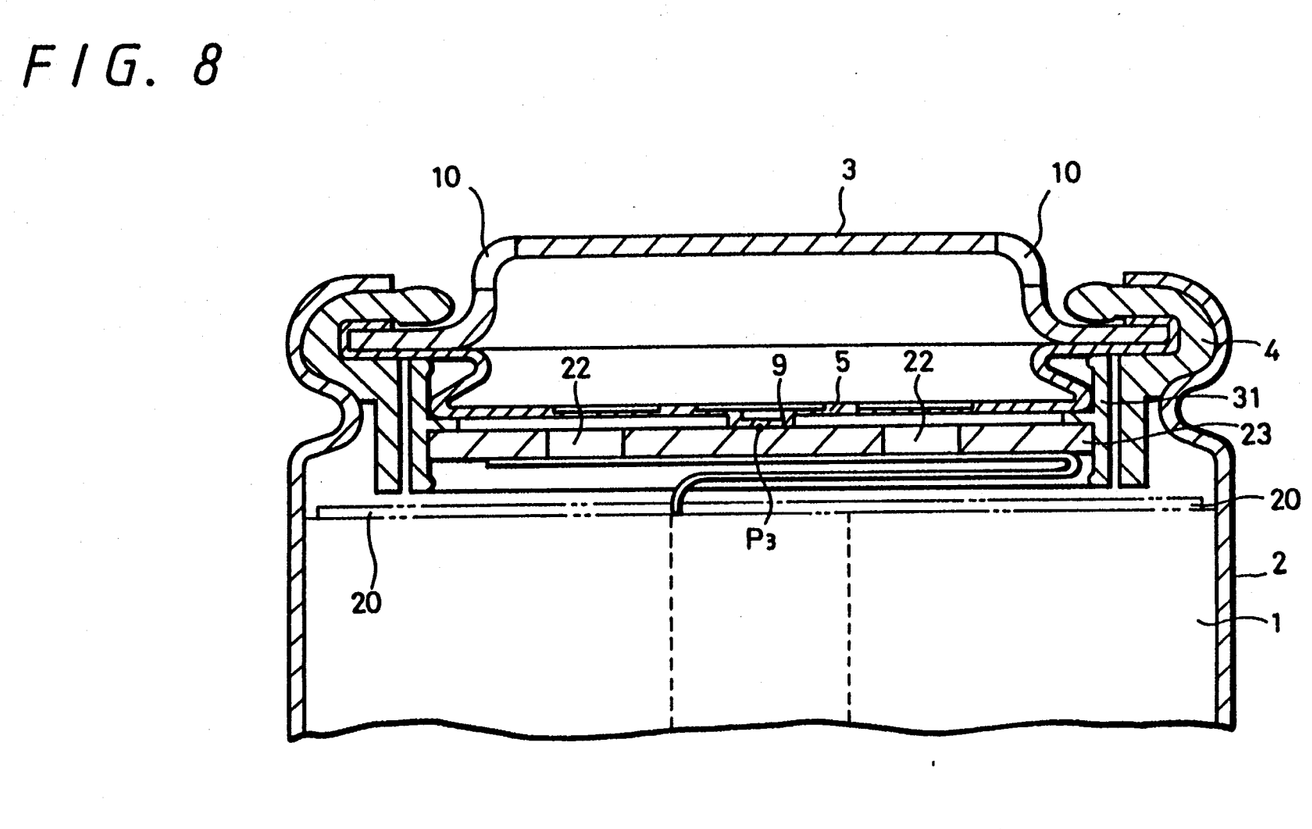
FIG. 8 is a cross-sectional view of a main part of another embodiment of the sealed battery according to the present invention.

FIG. 8 is a cross-sectional view of the main part of another embodiment of the sealed battery according to the present invention. This sealed battery similarly has the safety valve 5 which is made of a metal plate that is deformed by the increase of the pressure within the battery, and the current cutting-off means 6 which is actuated by the deformation of the safety valve 5. In addition, the safety valve 5 has the projection 9 at the center thereof, and this projection 9 faces the electric power generating element 1. Moreover, the disk 23 made of metal is fixed between the safety valve 5 and the element 1, and the safety valve projection 9 is welded to the disk 23 at the center thereof. This disk 23 has the gas apertures 22 bored therein at other positions. The ribbon lead 7 of the electric power generating element 1 is electrically connected to the element-1 side of the disk 23.

Figure 7:
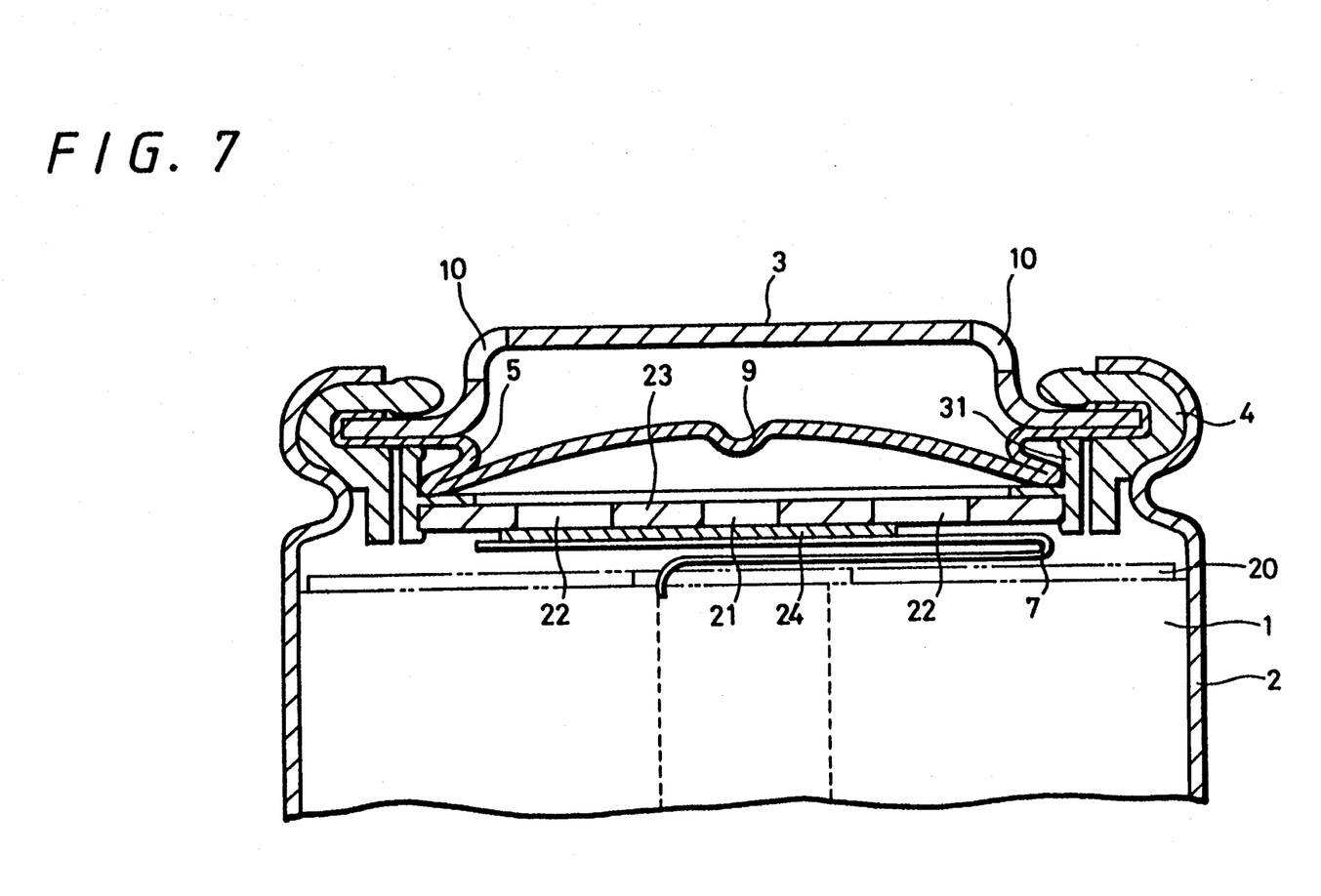
FIG. 7 is another cross-sectional view of the main part of the embodiment of the present invention of FIG. 6, showing the abnormal condition in which a gas is generated within the battery.
Figure 9:
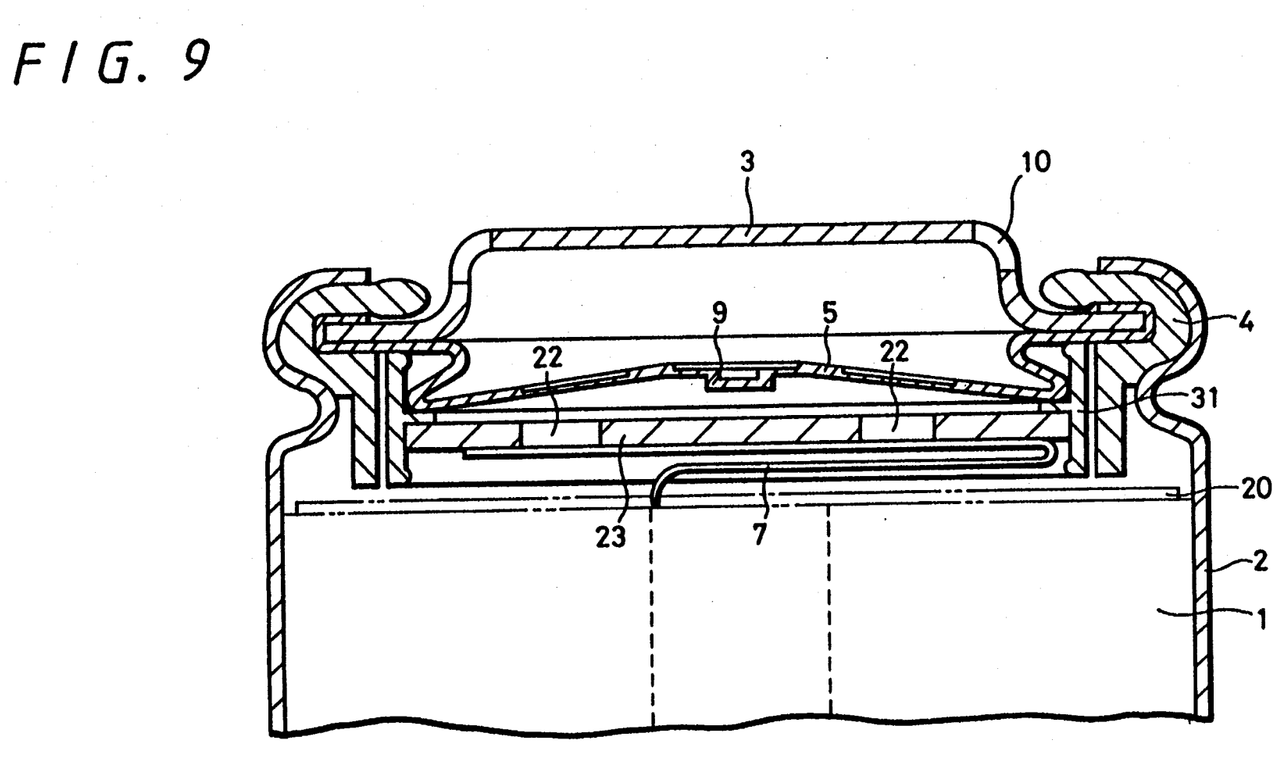
FIG. 9 is another cross-sectional view of the main part of the embodiment of FIG. 8, showing the abnormal condition in which a gas is generated within the battery.
Figure 10:
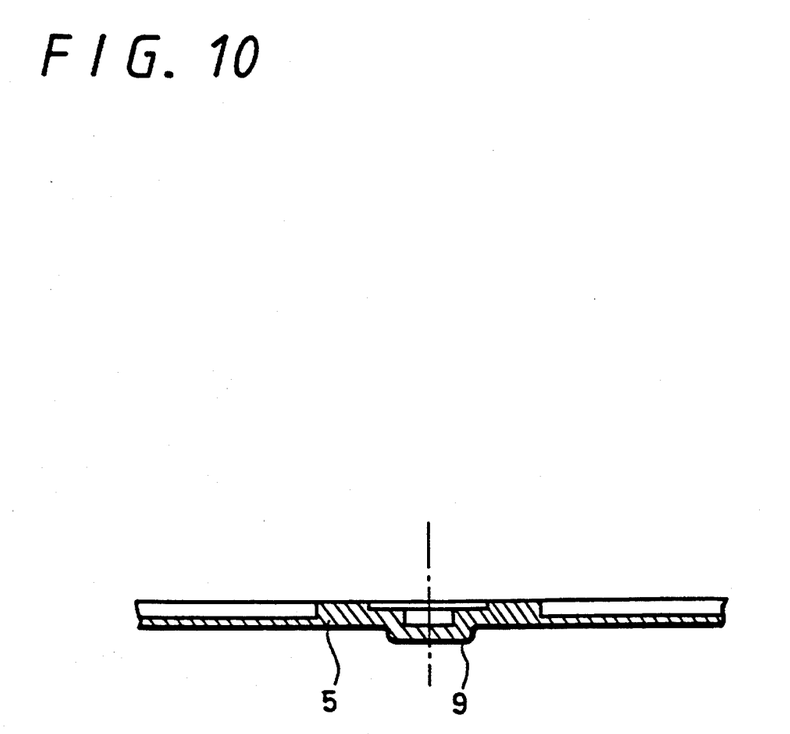
FIG. 10 is a cross-sectional view of an example of a safety valve.

According to the embodiments of the sealed battery of the invention, when the safety valve 5 is pushed up by the increase of the pressure within the battery, the safety valve 5 is deformed to be swollen toward the opposite side to the element 1 as shown in FIGS. 7 and 9. At this time, if the strength of the welded joints between the safety valve 5 and the thin metal plate 24 and between the safety valve 5 and the disk 23 is previously selected to be proper, or necessary values, the joints can be broken when the safety valve 5 is deformed to an extent according to the set weld strength.

Thus, according to the present invention, since the weld joint is broken by the increase of the pressure within the battery, the safety valve 5 can be electrically disconnected from the ribbon lead 7 of the electric power generating element 1. Thus, the current cutting-off means 6 is able to cut off the current, suppressing the gas from being further generated.

Therefore, since the deformation of the safety valve 5 makes it possible to reduce the pressure within the battery and to cut off the current, the pressure within the battery can be prevented from being much increased to an extent that the battery is fatally exploded.

According to the present invention, since the weld joint is broken by the deformation of the safety valve 5 due to the increase of the pressure within the battery, the safety valve 5 can be stably pulled off from the thin metal plate or the disk 23 as compared with the prior art in which the safety valve is pulled off from the flexible ribbon lead 7. In addition, the increase of the pressure within the battery is sure to cut off the current and stop the gas from generation.

The above embodiments of the sealed battery of the invention will be described more in detail.

The first embodiment of the invention will be described with reference to FIGS. 6 and 7.

The sealed battery of this embodiment has the current cutting-off means 6 provided between the electric power generating element 1 and the lid 3 which is used as the positive electrode terminal of the battery.

The electric power generating element 1 is produced similarly to the prior art as, for example, shown in FIGS. 1 through 5. In other words, sheets of negative and positive electrode materials and the separator that is impregnated with an electrolysis solution and interposed between these sheets are wound in a cylindrical shape to form the electric power generating element 1. In addition, leads of, for example, a ribbon shape are drawn out of the negative and positive electrodes. The negative ribbon lead not shown is connected to the bottom of the outer can 2.

The safety valve 5 is made of a metal material and formed in a dish-like shape by, for example, press molding. This dish-shaped, or disk-like shaped safety valve 5 has provided at its center the projection 9 that projects toward the element 1. The outer peripheral flange of the safety valve 5 is bent to wrap, or hold the outer edge of, for example, the lid 3 as illustrated. The edge of the lid 3 and the flange of the safety valve 5 are securely mounted, by caulking, together with the insulating ring-shaped gasket on the open end of the outer can 2 in which the element 1 has been enclosed.

The lid 3 has the apertures 10 bored therein for exhausting the generated gas. The outer can 2, however, can be maintained to be sealed, or shut off from the outside by the safety valve 5.

Moreover, a cylindrical disk holder 31 made of an insulating plastic material or the like is forcibly fitted on the outer periphery of the dish-like safety valve 5.

This cylindrical disk holder 31 has a ring plate 31a integrally provided at the middle position within the holder to project toward its center from its inner periphery. The disk 23 is pushed, or fixedly fitted into the disk holder 31 until it hits the ring plate 31a.

The disk 23 is made of a rigid and thick metal plate so that it can be maintained flat. The disk 23 has the central aperture 21 bored at its center. The projection 9 provided at the center of the safety valve 5 is loosely inserted into the central aperture 21 so that its tip can face the element 1 side surface of the disk 23.

A plurality of gas apertures 22 for passing the generated gas therethrough are bored in the disk 23 at other positions than the center of the disk, or at positions symmetrical with respect to the axis of the disk 23.

The thin metal plate 24 is attached to the element 1 side of the disk 23 and securely bonded to the disk 23 at points $P_1$ by, for example, welding.

This thin metal plate 24 is sized and shaped to close the central aperture 21 of the disk 23, oppose all the central aperture 21 and cross all the circumference of the central aperture 21.

In addition, one of the ribbon-shaped leads of the element 1 of the battery, or the positive-electrode side lead 7 is securely bonded to the element 1 side of the thin metal plate 24 at points $P_2$ by, for example, welding.

Moreover, the safety valve projection 9 of the safety valve 5 is inserted in the central aperture 21 of the disk 23 and welded to the thin metal plate 24 at a point $P_3$. In this case, the weld must have such a necessary bonding strength that the projection 9 can be easily pulled off from the thin metal plate 24 when the gas pressure within the battery is excessively increased.

Thus, the positive-electrode ribbon lead 7 of the element 1 of the battery is electrically connected to the lid 3 through the thin metal plate 24 and the safety valve 5.

Shown at 20 is an insulating sheet that is provided on the element 1 of the battery.

If now a gas is generated by some cause, for example, overload, overcharging or short-circuiting to increase the pressure within the battery, this gas is passed through the gas apertures 22 of the disk 23, and pushes the inner surface of the safety valve 5 up toward the lid 3. At this time, the safety valve projection 9 of the safety valve 5 resists the pushing force since its tip is welded to the thin metal plate 24 at the point $P_3$. However, when the pressure within the battery is increased to a certain extent or above, the weld at this point $P_3$ which has the previously-mentioned bonding strength set so that it can be easily broken under a certain pull is broken to cut off the current since the safety valve 5 is deformed, or bent outward so that its central portion is separated away from the disk 23 in an arc shape as shown in FIG. 7.

At this time, the thin metal plate 24 is fixed to the periphery of the central aperture 21 of the disk 23, and thus maintained to be flat. Therefore, the tip of the projection 9 can be surely pulled off, or disconnected at the weld of point $P_3$ from the thin metal plate 24 under a constant inner pressure of the battery. Thus, the gas can be stopped from generation.

When the gas is still generated under this condition, however, the airtightness of the safety valve 5 is broken under a certain extent of inner pressure, preventing the battery from being fatally destroyed because the safety valve 5 has a thin-wall portion provided though not shown.

According to this structure, the current cutting-off means 6, that is, the safety valve 5, the disk 23, the disk holder 31 and the thin metal plate 24 are previously assembled into the lid 3. When the lid 3 is mounted on the can 2, they are connected to the ribbon lead 7, and the gap between the edge of the lid 3 and the open end of the can 2 is caulked with the insulating ring-shaped gasket 4 so as to seal the can. Therefore, the quality of the current cutting-off means 6 can be checked before the completion of the battery.

While in the embodiment shown in FIGS. 6 and 7 the safety valve projection 9 of the safety valve 5 which is deformed by the increase of the inner pressure of the battery is welded to the thin metal plate 24 to which the ribbon lead 7 is welded, the current cutting-off means 6 can be formed in the following way. The thin metal plate 24 is omitted, and instead the projection 9 of the safety valve 5 is peelably welded to the disk 23 which is made of metal, or is electrically conductive as shown in FIG. 8. Thus, when the inner pressure of the battery is increased as shown in FIG. 9, the safety valve 5 is deformed to project toward the lid 3 and the projection 9 of the safety valve 5 is pulled off at the weld of point $P_3$ from the disk 23, thus cutting off the current.

In FIGS. 8 and 9, like elements corresponding to those in FIGS. 6 and 7 are identified by the same reference numerals and will not be described. In this embodiment, the safety valve projection 9 provided at the center of the valve 5 is welded to the center of the disk 23. Thus, this embodiment has no central aperture 21 which is provided in the embodiment shown in FIGS. 6 and 7. In addition, the ribbon lead 7 is welded to the element-1 side of the disk 23.

According to this invention, while the projection 9 of the safety valve 5 is peelably welded to the thin metal plate 24 or disk 23 at point $P_3$ as described above, it may be bonded by ultrasonic welding or laser welding. The strength of the weld can be set by properly selecting a value of the welding energy, a size of the weld point and the number of weld points.

Also, in the structure shown in FIGS. 8 and 9, since the safety valve 5 is welded to the disk 23, the height of the projection 9 can be reduced as shown by the cross-sectional view in FIG. 9, and thus the safety valve 5 can be produced with ease as compared with the structure shown in FIGS. 6 and 7 or the prior art shown in FIGS. 2 and 3 in which the projection 9 of the safety valve 5 is inserted through the aperture of the disk 23 to reach the opposite side of the disk to the safety-valve side and welded to the thin metal plate 24 or the ribbon lead 7.

Both the structures shown in FIGS. 6 and 8 are simplified and produced with ease, as compared with those of the prior art, since the disk holder 31 is cylindrical and has simply the ring plate 31a projected within the cylinder.

Figure 11:
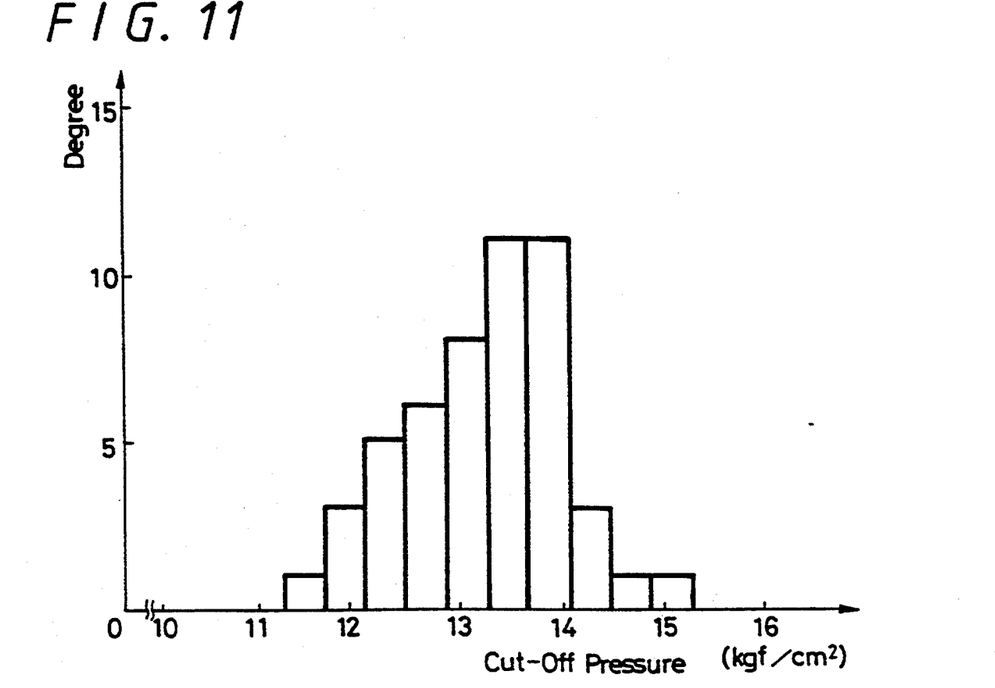
FIG. 11 is a graph showing the measured results of the cut-off pressure of the safety valve of the sealed battery according to the present invention.

Fifty batteries of the structure shown in FIGS. 8 and 9 were produced and the inner pressure of the battery at which the current cutting-off means 6 by the safety valve 5 is actuated to cut off the current was measured for each of the batteries. FIG. 11 shows the results of the measurement, or the relation between the cut-off pressure and the number of the corresponding batteries.

Figure 12:
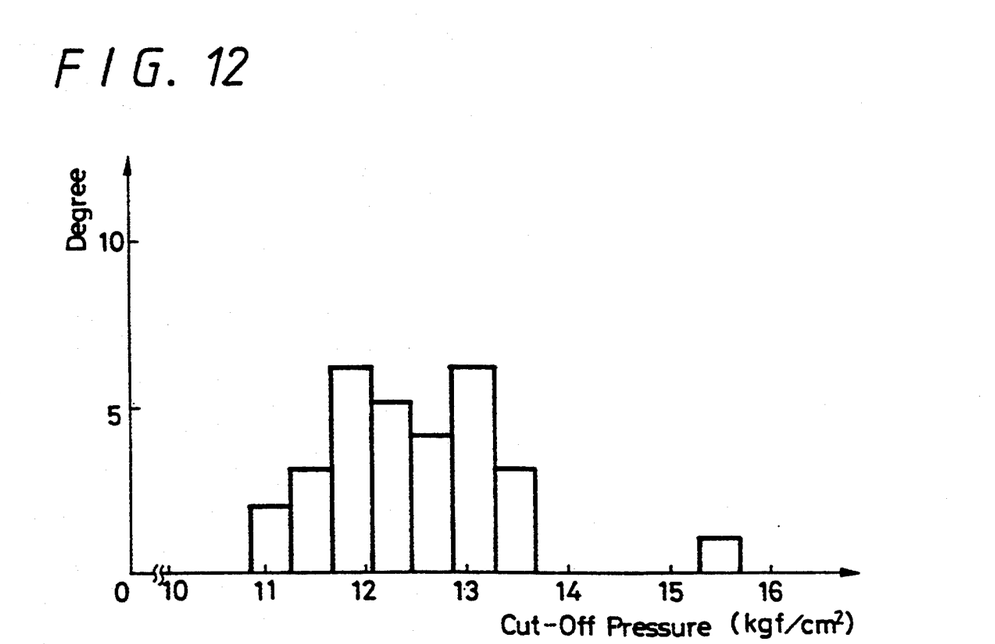
FIG. 12 is a graph showing the measured results of the cut-off pressure of the safety valve of the conventional sealed battery.

Similarly, 30 batteries of the conventional structure shown in FIGS. 2 and 3 were produced and the pressure was measured for each of the batteries similarly. FIG. 12 shows the results of the measurement.

From the comparison of FIGS. 11 and 12, it will be seen that the distribution of the cutoff pressure of the invention is narrower than that of the prior art. In this connection, the standard deviation $\sigma$ in the invention is 0.75, while that in the prior art is 0.92.

According to the present invention, for cutting off the current, the safety valve 5 which is deformed by the increase of the inner pressure of the battery is not pulled off from the flexible ribbon lead itself as in the prior art, but the safety valve 5 can be pulled off from the thin metal plate 24 or the disk 23 which is previously electrically connected to the ribbon lead of the battery and to which the safety valve is previously welded to be peelable by a certain necessary force. Therefore, the current can be surely cut off by the excessive increase of the inner pressure of the battery.

When the safety valve 5 is pulled off, the end of the lead 7 is still fixed to the thin metal plate 24 or disk 23. Thus, the lead is not unstably floated, and therefore it can be prevented from being made in contact with others, for example, the can 2.

While the current cutting-off means 6 is provided on the positive electrode side of the battery as above, this means 6 may be provided on the negative electrode side of the battery.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A sealed battery, comprising:
   a safety valve having a metal plate which can be deformed by the increase of the inner pressure of said battery, and current cutting-off means which is actuated by the deformation of said metal plate, and a safety valve projection provided at a center of said plate to project toward an electric power generating element of said battery;
   a disk having a central aperture in which said safety valve projection is inserted and gas apertures through which gas is passed, fixed between said safety valve and said electric power generating element; and
   a thin metal plate to which one of the leads of said electric power generating element is connected, attached to said disk on an element said thereof to close said central aperture, and said safety valve projection is welded to said thin metal plate through said central aperture.

2. A sealed battery, comprising:
   a cylindrical can holding power generating elements and covered by a lid which provides an electrical contact;
   a safety valve arranged within said cylindrical can beneath said lid and having a disk with gas apertures;
   a metal plate in electrical contact with said lid and covering said disk to be subjected to gas pressure through said apertures from within said can below said disk;
   an electrical conductor proceeding from within said can from said power generating elements within said can to a position near to said disk, said metal plate having a projected contact making electrical connection to said conductor, said electrical connection breakable upon excess pressure which deforms said metal plate and moves said projection away from said disk, said disk having a central aperture into which said projection is inserted; and
   a thin metal plate to which said electrical conductor is connected and mounted to said disk on a side opposite from said metal plate, to close said central aperture, and said safety valve projection is welded to said thin metal plate through said central aperture.

3. A sealed battery, comprising:

a cylindrical can holding power generating elements and covered by a lid which provides an electrical contact;

a safety valve arranged within said cylindrical can beneath said lid and having a disk with gas apertures;

a metal plate in electrical contact with said lid and covering said disk to be subjected to gas pressure through said apertures from within said can below said disk;

an electrical conductor proceeding from within said can from said power generating elements within said can to be connected to a first surface of said disk, said metal plate having a projected contact connected to a second surface of said disk, in normal use electricity conducted from said conductor through a thickness of said disk to said metal plate, said electrical conduction breakable upon excess pressure which deforms said metal plate and moves said projection away from said disk.

* * * * *